(12) United States Patent
Bartlett et al.

(10) Patent No.: US 10,229,023 B2
(45) Date of Patent: **\*Mar. 12, 2019**

(54) RECOVERY OF STORAGE DEVICE IN A REDUNDANT ARRAY OF INDEPENDENT DISK (RAID) OR RAID-LIKE ARRAY

(71) Applicant: International Business Machines Corporation, Armonk, NY (US)

(72) Inventors: Eric J. Bartlett, Bowerchalke (GB); Matthew J. Fairhurst, Winchester (GB); William J. Scales, Fareham (GB)

(73) Assignee: International Business Machines Corporation, Armonk, NY (US)

( \* ) Notice: Subject to any disclaimer, the term of this patent is extended or adjusted under 35 U.S.C. 154(b) by 262 days.

This patent is subject to a terminal disclaimer.

(21) Appl. No.: 14/975,650

(22) Filed: Dec. 18, 2015

(65) Prior Publication Data

US 2016/0103746 A1 Apr. 14, 2016

Related U.S. Application Data

(63) Continuation of application No. 14/325,257, filed on Jul. 7, 2014, now Pat. No. 9,244,784, which is a
(Continued)

(30) Foreign Application Priority Data

Oct. 6, 2010 (EP) .................................... 10186719

(51) Int. Cl.
*G06F 11/00* (2006.01)
*G06F 11/20* (2006.01)
(Continued)

(52) U.S. Cl.
CPC .......... *G06F 11/2094* (2013.01); *G06F 3/065* (2013.01); *G06F 3/0619* (2013.01);
(Continued)

(58) Field of Classification Search
CPC ............. G06F 11/2094; G06F 11/1645; G06F 11/2092; G06F 11/1088; G06F 3/0619;
(Continued)

(56) References Cited

U.S. PATENT DOCUMENTS 6,223,252 B1 4/2001 Bandera et al.
7,409,582 B2 8/2008 McNeill, Jr. et al.
(Continued)

OTHER PUBLICATIONS

Wikipedia definition for RAID, retrieved from https://en.wikipedia.org/wiki/RAID on Feb. 15, 2018 (Year: 2018).\*
(Continued)

*Primary Examiner* — Yair Leibovich
(74) *Attorney, Agent, or Firm* — Zilka-Kotab, P.C.

(57) ABSTRACT

A computer-implemented method for managing storage devices in a storage subsystem having an array of storage devices, according to one embodiment, includes determining that at least one storage device in the array of storage devices has failed. Storage device characteristics of the failed storage device are compared with storage device characteristics of each of a plurality of candidate devices, and an attempt is made to identify a first candidate storage device having storage device characteristics that match the storage device characteristics of the failed storage device. A second candidate storage device having storage device characteristics most similar to the storage device characteristics of the failed storage device is identified in response to not identifying a candidate device that matches the failed storage device.

18 Claims, 12 Drawing Sheets

Related U.S. Application Data continuation of application No. 13/484,192, filed on May 30, 2012, now Pat. No. 8,826,065, which is a continuation of application No. 13/251,037, filed on Sep. 30, 2011, now Pat. No. 9,619,353.

(51) Int. Cl.
  *G06F 11/16* (2006.01)
  *G06F 3/06* (2006.01)
  *G06F 11/10* (2006.01)

(52) U.S. Cl.
  CPC ........ *G06F 3/0689* (2013.01); *G06F 11/1645* (2013.01); *G06F 11/2092* (2013.01); *G06F 11/1088* (2013.01); *G06F 2201/805* (2013.01)

(58) Field of Classification Search
  CPC ... G06F 3/065; G06F 3/0689; G06F 2201/805
  USPC ...................................................... 714/6.22
  See application file for complete search history.

(56) References Cited

U.S. PATENT DOCUMENTS

| | | | |
|---|---|---|---|
| 7,543,178 B2 | 6/2009 | McNeill et al. | |
| 7,661,012 B2 | 2/2010 | Kalos et al. | |
| 8,271,655 B2 | 9/2012 | Dawson et al. | |
| 8,826,065 B2* | 9/2014 | Bartlett | G06F 11/2094 714/6.22 |
| 9,244,784 B2* | 1/2016 | Bartlett | G06F 11/2094 |
| 9,619,353 B2* | 4/2017 | Bartlett | G06F 11/2094 |
| 2002/0102018 A1 | 8/2002 | Lin et al. | |
| 2004/0243692 A1* | 12/2004 | Arnold | G06F 9/5016 709/220 |
| 2005/0081006 A1 | 4/2005 | Shackelford et al. | |
| 2005/0114593 A1 | 5/2005 | Cassell et al. | |
| 2007/0214313 A1 | 9/2007 | Kalos et al. | |
| 2008/0010403 A1 | 1/2008 | Tsukada et al. | |
| 2010/0169575 A1 | 7/2010 | Masaki et al. | |
| 2011/0225360 A1 | 9/2011 | Baptist et al. | |
| 2011/0307087 A1 | 12/2011 | Degbotse et al. | |
| 2012/0089867 A1 | 4/2012 | Bartlett et al. | |
| 2012/0239970 A1 | 9/2012 | Bartlett et al. | |
| 2014/0317445 A1 | 10/2014 | Bartlett et al. | |
| 2017/0041393 A1* | 2/2017 | Mortazavi | H04L 67/1097 |

OTHER PUBLICATIONS

Notice of Allowance from U.S. Appl. No. 13/251,037, dated Nov. 29, 2016.
Examiner's Answer to Appeal Brief from U.S. Appl. No. 13/251,037, dated Nov. 6, 2014.
Advisory Action from U.S. Appl. No. 13/251,037, dated Jun. 12, 2014.
Final Office Action from U.S. Appl. No. 13/251,037, dated Feb. 13, 2014.
Final Office Action from U.S. Appl. No. 13/484,192, dated Feb. 13, 2014.
Notice of Allowance from U.S. Appl. No. 13/484,192, dated Apr. 25, 2014.
Bartlett et al., U.S. Appl. No. 14/325,257, filed Jul. 7, 2014.
Non-Final Office Action from U.S. Appl. No. 14/325,257, dated Jan. 16, 2015.
Notice of Allowance from U.S. Appl. No. 14/325,257, dated Sep. 14, 2015.
Bartlett et al., U.S. Appl. No. 13/251,037, filed Sep. 30, 2011.
Non-Final Office Action from U.S. Appl. No. 13/251,037, dated Oct. 7, 2013.
Bartlett et al., U.S. Appl. No. 13/484,192, filed May 30, 2012.
Non-Final Office Action from U.S. Appl. No. 13/484,192, dated Oct. 7, 2013.
Patent Board Decision on Appeal from U.S. Appl. No. 13/251,037, dated Aug. 19, 2016.

\* cited by examiner

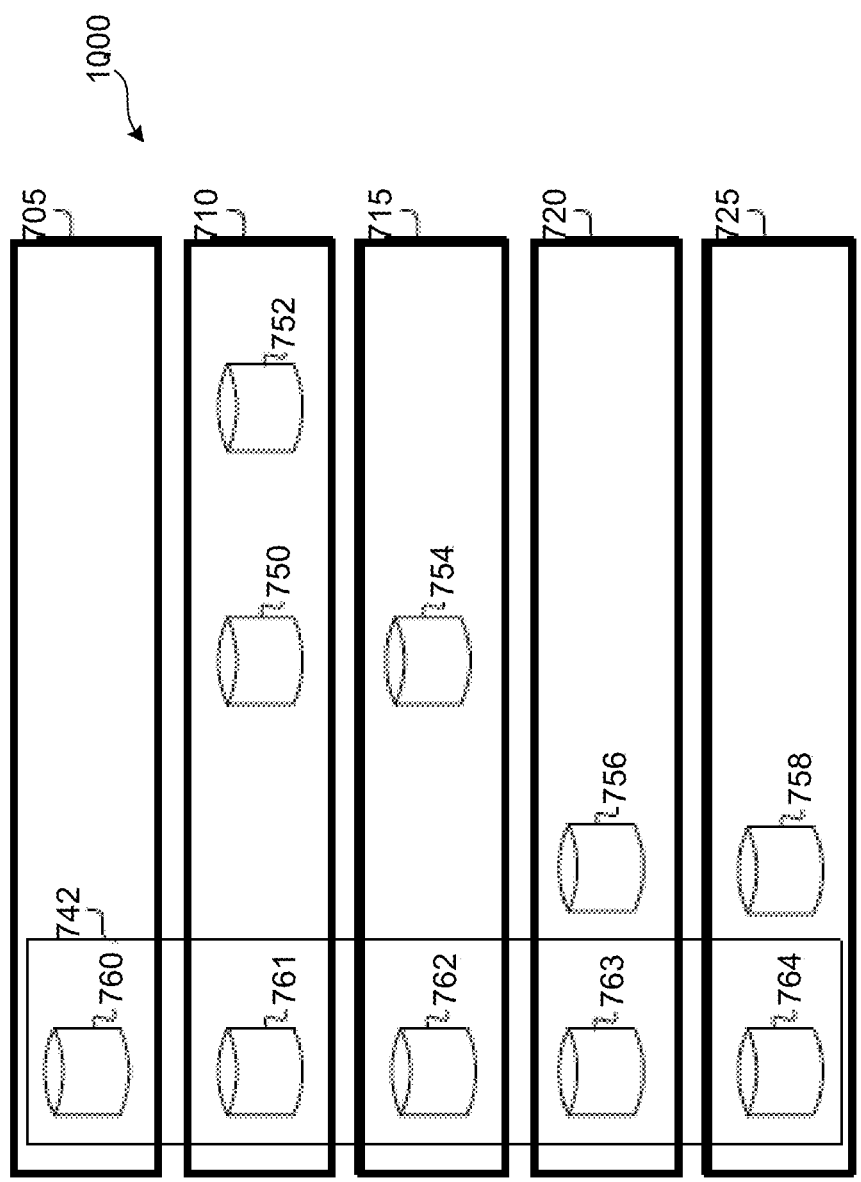

FIG. 11

1110 — Table (1150 ID | 1155 TYPE | 1160 SIZE | 1165 SPEED k rpm | 1170 LOCATION | 1175 BANDWIDTH MB/s)

| ID | TYPE | SIZE | SPEED k rpm | LOCATION | BANDWIDTH MB/s |
|---|---|---|---|---|---|
| id 1 | SAS | 146 GB | 15 | Enclosure5 | 600 |

1120 —

| ID | TYPE | SIZE | SPEED k rpm | LOCATION | BANDWIDTH MB/s |
|---|---|---|---|---|---|
| 756 | SAS | 300GB | 15 | Enclosure4 | 300 |
| 754 | SAS | 146GB | 15 | Enclosure3 | 600 |
| 750 | SATA | 146GB | 10 | Enclosure2 | 300 |
| 752 | SATA | 72GB | 10 | Enclosure2 | 600 |
| 758 | SAS | 146GB | 10 | Enclosure5 | 600 |

1130 —

| ID | TYPE | SIZE | SPEED k rpm | LOCATION | BANDWIDTH MB/s |
|---|---|---|---|---|---|
| 756 | SATA | 250GB | 15 | Enclosure4 | 300 |
| 754 | SAS | 146GB | 15 | Enclosure3 | 600 |
| 750 | SATA | 146GB | 10 | Enclosure2 | 300 |

1140 —

| ID | TYPE | SIZE | SPEED k rpm | LOCATION | BANDWIDTH MB/s |
|---|---|---|---|---|---|
| 756 | SAS | 250GB | 15 | Enclosure4 | 300 |

1100

RECOVERY OF STORAGE DEVICE IN A REDUNDANT ARRAY OF INDEPENDENT DISK (RAID) OR RAID-LIKE ARRAY

BACKGROUND

This invention relates to storage systems, and particularly to an apparatus, method, and computer program product for protecting data on failed storage devices.

In storage systems, at least one redundant array of independent disks (RAID) may be used to provide a mixture of performance and storage device redundancy characteristics. RAID is made up of sets of individual drives that can be described in terms of their capability and physical/logical location.

RAID geometries may have redundancy to enable a failed or inaccessible array member storage device to be removed from the array while maintaining data integrity and access to the array. It is common in storage systems to provide additional fault tolerance by having the capability to select a spare storage device that has been allocated to replace the failed storage device and for the array to rebuild the member data as a background process. Once the rebuild completes, the array redundancy is restored.

It is possible that the original storage device that was marked as failed or inaccessible may be recovered to a usable state without intervention. This may happen because a network fault, which may have temporarily isolated a set of drives, has been remedied. Alternatively, an Error Recovery Procedure (ERP) may have resolved a problem on a previously failed/inaccessible storage device, and therefore the storage device becomes available again.

Existing solutions may implement sparing schemes that only allow sparing within the same technology type, for example a hard disk drive (HDD), or a solid state device (SSD). In terms of restoring the system configuration, these schemes are rigid as they only reinstate drives when the original storage device or an exact match replacement storage device in terms of technology, performance, and location, is available. The user cannot alter the array member storage device properties as part of servicing the storage device failure.

Other devices have an option in a Directed Maintenance Procedure (DMP) for replacing a failed storage device to put a new storage device back into a RAID where the failed storage device used to be. This performs a regular component rebuild (and so redundancy is not maintained). This type of procedure is sub-optimal as it sacrifices array redundancy to progress the service action.

From the customer perspective, after a storage device has failed, existing storage system solutions require maintenance procedures to recover the system to its original configuration. The intervention required to restore the original intended configuration contributes to product maintenance costs, which is undesirable.

BRIEF SUMMARY

A computer program product for managing storage devices in a storage subsystem having an array of storage devices, according to one embodiment, includes a computer readable storage medium having program instructions embodied therewith, the program instructions being executable by a processor to cause the processor to perform a method that includes determining that a storage device in an array of storage devices has failed. A first candidate storage device having storage device characteristics that match storage device characteristics of the failed storage device is identified. The first candidate storage device is exchanged with a second candidate storage device in response to determining that the second candidate storage device has storage device characteristics that are more similar to the storage device characteristics of the array of storage devices than the first candidate storage device.

A computer-implemented method for managing storage devices in a storage subsystem having an array of storage devices, according to one embodiment, includes determining that at least one storage device in the array of storage devices has failed. Storage device characteristics of the failed storage device are compared with storage device characteristics of each of a plurality of candidate devices, and an attempt is made to identify a first candidate storage device having storage device characteristics that match the storage device characteristics of the failed storage device. A second candidate storage device having storage device characteristics most similar to the storage device characteristics of the failed storage device is identified in response to not identifying a candidate device that matches the failed storage device.

A system according to one embodiment includes a processor and logic integrated with and/or executable by the processor. The logic is configured to determine that at least one storage device in the array of storage devices has failed. Storage device characteristics of the failed storage device are compared with storage device characteristics of each of a plurality of candidate devices, and an attempt is made to identify a first candidate storage device having storage device characteristics that match the storage device characteristics of the failed storage device. A second candidate storage device having storage device characteristics most similar to the storage device characteristics of the failed storage device is identified in response to not identifying a candidate device that matches the failed storage device.

BRIEF DESCRIPTION OF THE DRAWINGS

The present invention will now be described, by way of example only, with reference to preferred embodiments, as illustrated in the following figures.

FIG. 10 depicts the exemplary storage subsystem after replacement of a failed storage device with a new storage device, according to one embodiment.

FIG. 11 depicts records used, according to one embodiment.

DETAILED DESCRIPTION

Figure 1:
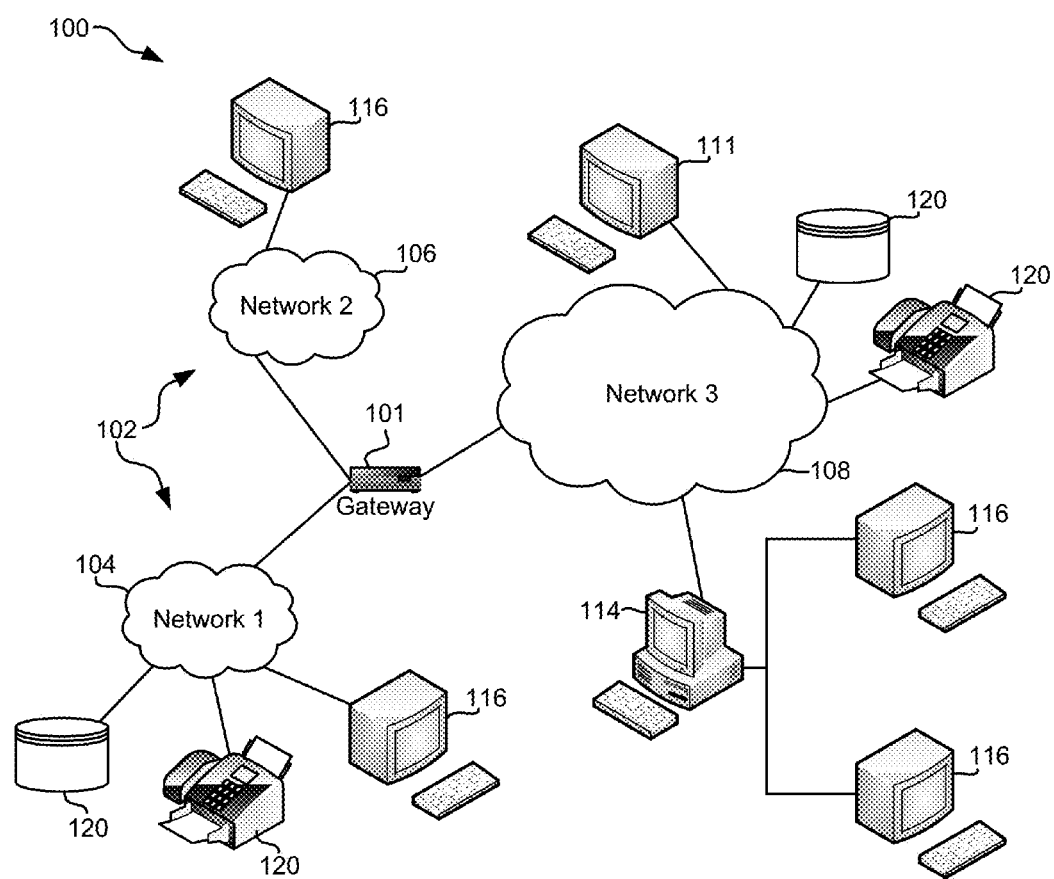
FIG. 1 illustrates a network architecture, in accordance with one embodiment.

The following description is made for the purpose of illustrating the general principles as disclosed in the present descriptions and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for managing storage devices in a storage system.

In one general embodiment, a system for managing storage devices includes a storage subsystem having an array of storage devices; a receiving component adapted for receiving an error message; a determining component adapted for determining that the error message indicates that at least one storage device in the array of storage devices has failed; a collecting component adapted for collecting an array record having storage device characteristics of the failed storage device in response to determining that the error message indicates that the at least one storage device has failed; a collating component adapted for collating a candidate record having a plurality of candidate entries, wherein each candidate entry has storage device characteristics for one of a plurality of candidate storage devices; a comparing component adapted for comparing storage device characteristics of the failed storage device of the array record with the storage device characteristics of each of the candidate entries; and an identifying component adapted for identifying a first candidate storage device having storage device characteristics that match the storage device characteristics of the failed storage device in response to the comparing component identifying a candidate entry that matches the storage device of the array record, and identifying a second candidate storage device having storage device characteristics most similar to the storage device characteristics of the failed storage device in response to the comparing component not identifying a candidate entry that matches the failed storage device of the array record.

In another general embodiment, a method for managing storage devices in a storage subsystem having an array of storage devices includes receiving an error message; determining that the error message indicates that at least one storage device in the array of storage devices has failed; collecting an array record having storage device characteristics of the failed storage device in response to the determining that the error message indicates that the at least one storage device has failed; collating a candidate record having a plurality of candidate entries, wherein each candidate entry has storage device characteristics for one of a plurality of candidate storage devices; comparing storage device characteristics of the failed storage device of the array record with the storage device characteristics of each of the candidate entries; identifying a first candidate storage device having storage device characteristics that match the storage device characteristics of the failed storage device in response to identifying a candidate entry that matches the storage device of the array record; and identifying a second candidate storage device having storage device characteristics most similar to the storage device characteristics of the failed storage device in response to not identifying a candidate entry that matches the failed storage device of the array record.

In another general embodiment, a computer program product for managing storage devices in a storage subsystem having an array of storage devices includes a computer readable storage medium having computer readable program code embodied therewith. The computer readable program code is configured for: receiving an error message; determining that the error message indicates that at least one storage device in the array of storage devices has failed; collecting an array record having storage device characteristics of the failed storage device in response to the determining that the error message indicates that the at least one storage device has failed; collating a candidate record having a plurality of candidate entries, wherein each candidate entry has storage device characteristics for one of a plurality of candidate storage devices; comparing storage device characteristics of the failed storage device of the array record with the storage device characteristics of each of the candidate entries; identifying a first candidate storage device having storage device characteristics that match the storage device characteristics of the failed storage device in response to identifying a candidate entry that matches the storage device of the array record; and identifying a second candidate storage device having storage device characteristics most similar to the storage device characteristics of the failed storage device in response to not identifying a candidate entry that matches the failed storage device of the array record.

As will be appreciated by one skilled in the art, aspects as disclosed in the present descriptions may be embodied as a system, method or computer program product. Accordingly, aspects as disclosed in the present descriptions may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects as disclosed in the present descriptions may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium includes the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Specific examples of the computer readable signal medium include, but are not limited to an electrical connection having one or more wires, an optical fiber, etc. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects as disclosed in the present descriptions may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects as disclosed in the present descriptions are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
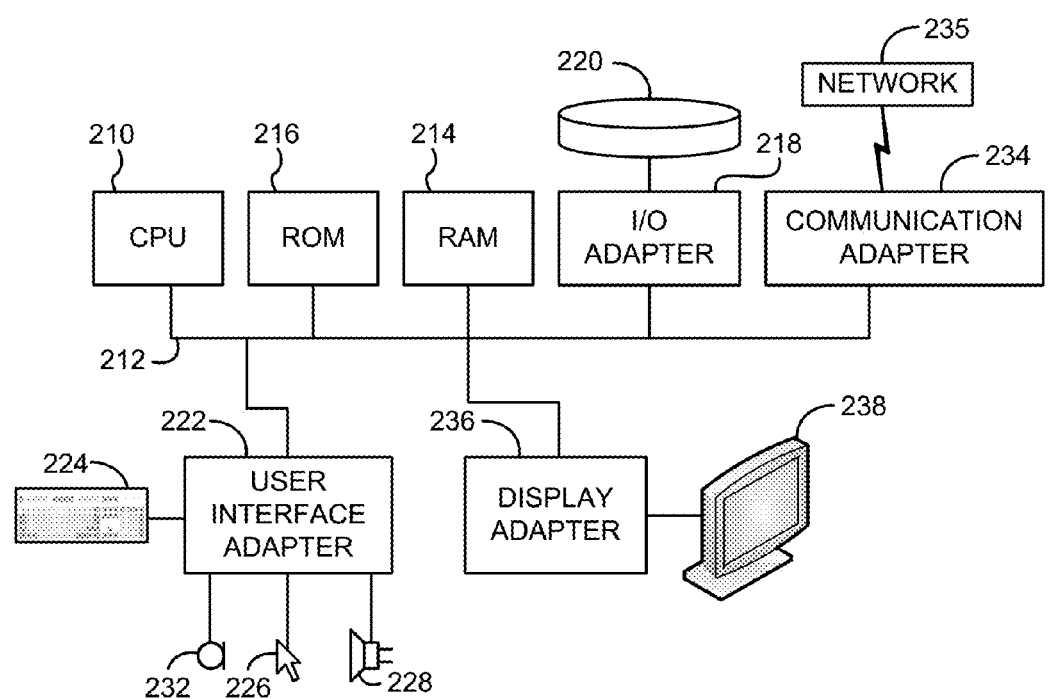
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

Preferred embodiments described in the present descriptions improve on existing solutions by expressing the array member storage device characteristics as a flexible set of array member storage device goals, using those goals to select the most appropriate spare storage device for hot spare takeover, and incrementally rebalancing to the original configuration after storage device recovery.

Advantageously, after a storage device failure has caused a hot spare to be taken as an array member and the array has rebuilt to restore redundancy, the system is now 'out of balance' with the intended configuration goals. The array member goals may be used, in some approaches, to select a closer match to the intended system configuration from any drives that have been recovered. The system can then perform a 'concurrent exchange' to install the closer storage device match to the original array member configuration (and the concurrent exchange maintains array redundancy). In preferred embodiments, the most similar match does not need to be an exact match, as this may be undesirable with existing products.

Moreover, at a later time, when the original storage device is recovered, in some preferred embodiments, another better match may be identified as being available. The better match is concurrently exchanged to reinstate the original storage device to the original array member to restore the intended system configuration. In this way, after failed drives have been recovered, the system is restored to its original configuration without intervention, according to some approaches. The 'incremental rebalancing' process is an enhancement over existing rigid schemes that exist today that require the original storage device to be recovered, by achieving closer matches to the original system configuration.

In addition, alongside incremental rebalancing, a concept of user specified array member storage device goals is introduced. Once an array member storage device has changed because of sparing and incremental rebalancing, a user may issue commands to set the new storage device as the desired array member storage device goal, in some approaches. This offers greater flexibility when following service procedures, because it does not require the original storage device location to be reused for the end system configuration. Since the 'best match' storage device is always selected, this means that cross technology type sparing is allowed and has the benefit that system redundancy can be restored in a wider range of multiple storage device failure scenarios.

In one embodiment, these enhancements increase the ability of the system to cope with storage device availability changes by always selecting the 'best match' replacement drives to use. Preferred embodiments also offer the user greater flexibility in choosing how to recover the system configuration.

Advantageously, the system stores goals for each member representing its capabilities. These goals are used to pick appropriate spares and then rebalance after multiple failures and storage device replacements. The requirement to store per-member goals rather than per-array goals arises from supporting an arbitrary user-created configuration and dealing with unpredictable scenarios following storage device failures.

Also, when the original storage device becomes available again, it may be desirable to reinstate the original configuration or a configuration as close to it as possible, in some approaches.

Figure 3:
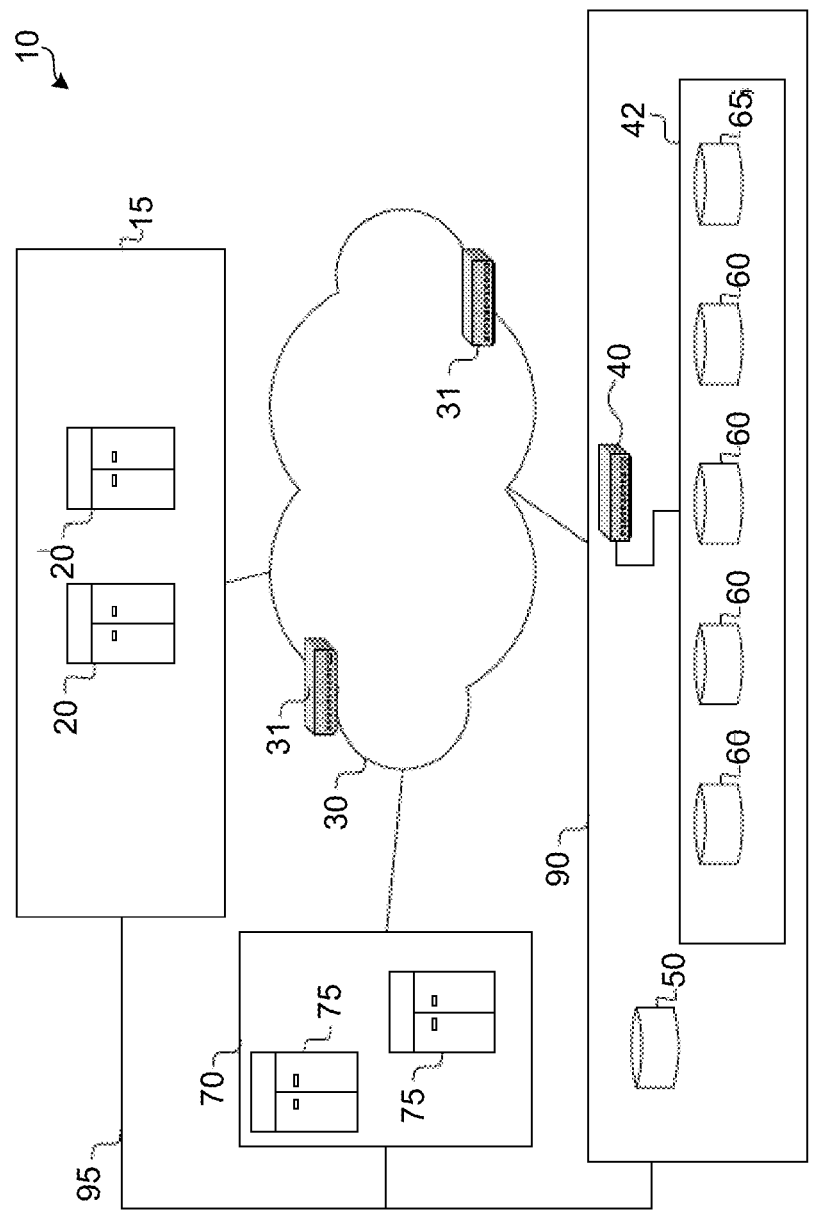
FIG. 3 shows a block diagram depicting a data processing system, in accordance with the prior art.

Referring now to FIG. 3, a block diagram is shown depicting a data processing system 10, in accordance with the prior art. Redundant data may be held in different forms, but for the purpose of explaining the present invention, a RAID 5 may be used as an example in some approaches. However, it will be appreciated that the invention is applicable to any RAID version, including future versions, which use a redundancy scheme similar to that described above as would be understood by one of skill in the art upon reading the present descriptions.

The illustrated data processing system 10 comprises a server node subsystem 15 having a set of server nodes 20, which are connectable through a network 30 to a back-end storage subsystem 90. A network 30 may comprise network devices 31, for example switches, and cabling that connect the server node subsystem 15 to a hardware back-end storage subsystem 90. The storage subsystem 90 may comprise a variety of physical storage devices having, for example, one or more stand-alone Just a Bunch of Disks (JBOD) devices 50, and a RAID 42. The RAID 42 comprises a plurality of storage devices 60, 65. A storage device 65 may be used to store a parity value associated with data stored on the other storage devices 60 in the RAID 42. The parity storage device 65 is not typically exclusively used to store a parity value, as in industry standard RAID implementations, parity is often rotated around the storage devices 60, 65 that comprise the RAID 42. The storage devices 42, 50 may be presented to the server node subsystem 15 as a set of physical or logical storage volumes (not depicted). Typically, the system 10 is managed by a management subsystem 70 comprising management servers 75, connectable to the server node subsystem 15, the storage subsystem 90, and the network devices 31 through the network 30 or through a separate Local Area Network (LAN) 95. Typically, a RAID Controller 40 controls the functionality of the RAID 42, including data accesses and power controls to the individual storage devices 60, 65. Read and write commands may be sent to the storage subsystem 90 by a requester (not depicted) that may be an application program operable in the data processing system 10 or any other type of requester as would be understood by one of skill in the art upon reading the present descriptions.

Figure 4:
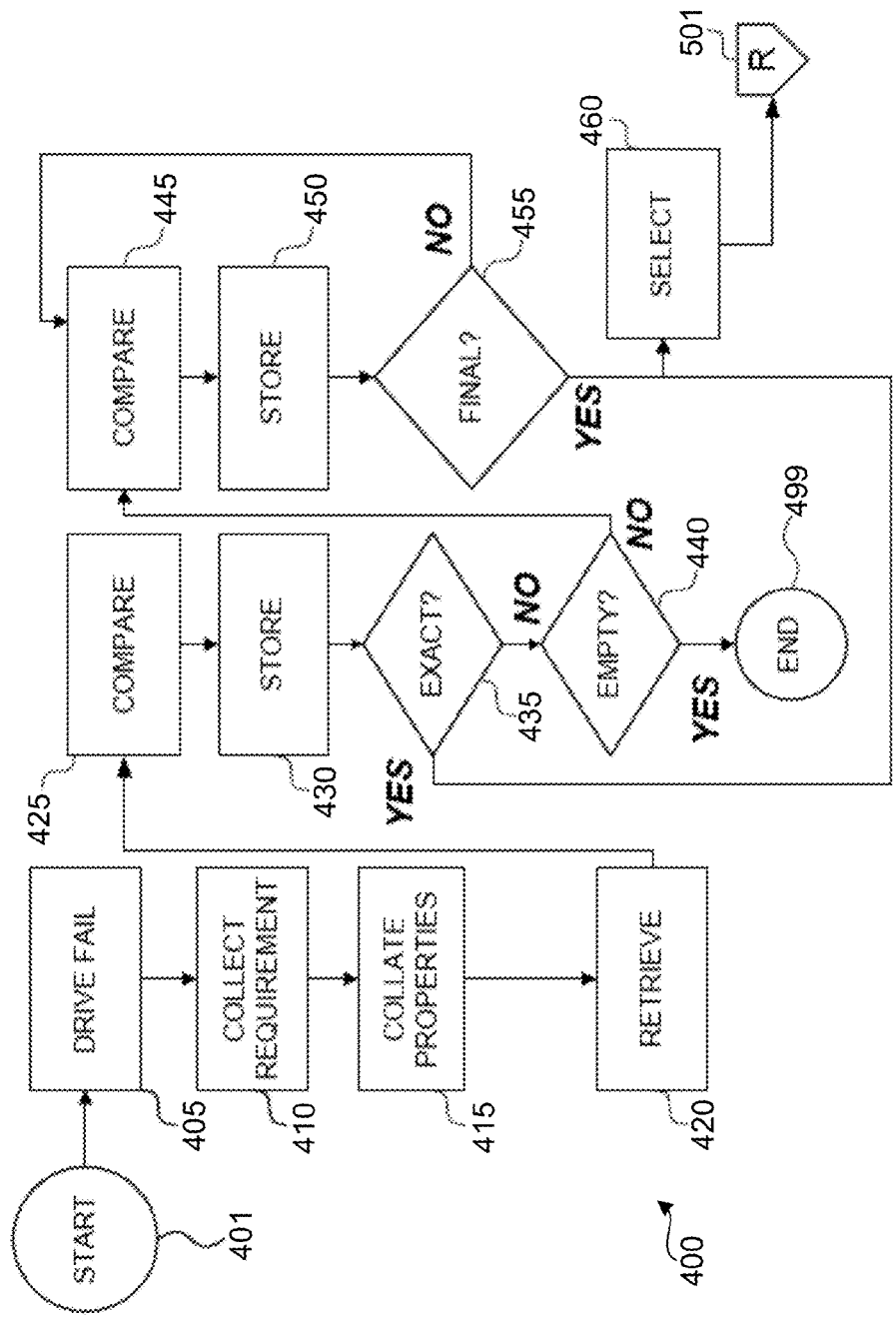
FIG. 4 is a high-level exemplary schematic flow diagram depicting operation selection method steps performed for array member initial selection in a data processing system, according to one embodiment.

FIG. 4, which may be read in conjunction with FIGS. 5-11, is a high-level exemplary schematic flow diagram 400 depicting typical operation selection method steps performed for array member initial selection in a data processing system, in accordance with a preferred embodiment as disclosed in the present descriptions. In the selection method, a failed storage device 764 is exchanged in an array 742 by the most suitable candidate storage device 756.

Figure 5:
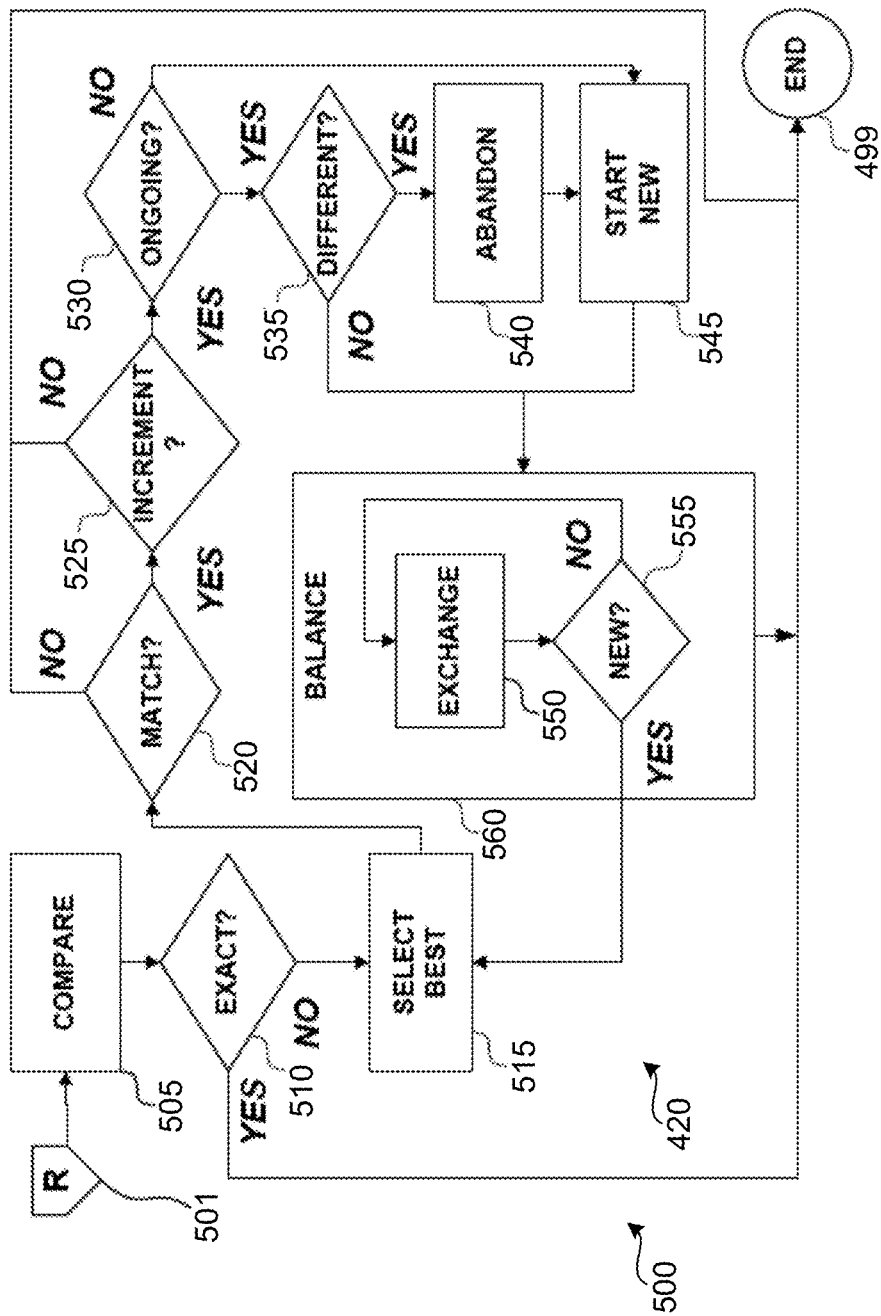
FIG. 5 is a high-level exemplary schematic flow diagram depicting operation balancing method steps for array member re-balancing in a data processing system, according to one embodiment.

FIG. 5, which may be read in conjunction with FIGS. 4, 6-11 continues on from the selection method depicted in FIG. 4, and is a high-level exemplary schematic flow diagram 500 depicting typical operation balancing method steps for array member re-balancing in a data processing system, in accordance with a preferred embodiment as disclosed in the present descriptions. In the balancing method, a previously selected storage device 756 is exchanged in the array 742 by a more suitable storage device 758, 785.

Figure 6:
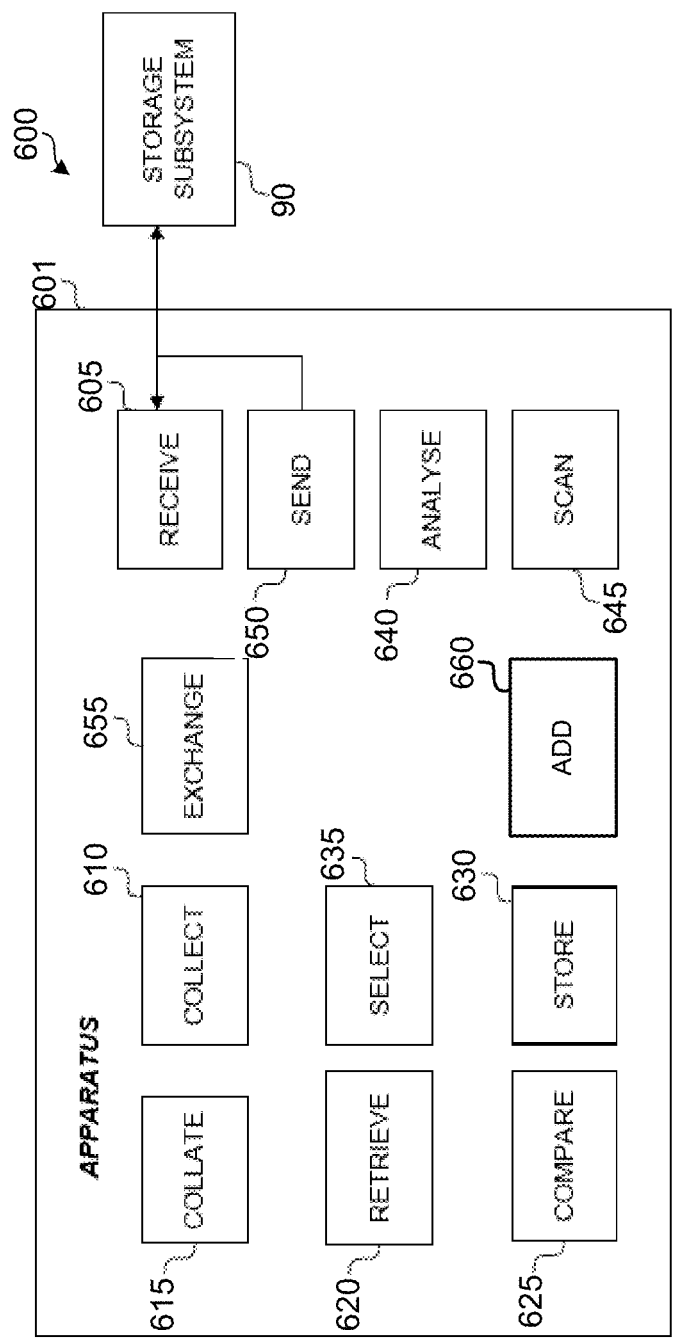
FIG. 6 is a high-level exemplary block diagram depicting a management apparatus, according to one embodiment.

FIG. 6 is a high-level exemplary block diagram depicting a management apparatus 600 according to one embodiment. The management apparatus may be, but is not restricted to be, operable in a RAID controller 40 in preferred embodiments.

In one embodiment, as shown in FIG. 6, a system 600 for managing storage devices comprises a storage subsystem 601 comprising an array of storage devices, a receiving component 605 adapted for receiving an error message, a determining component 640 adapted for determining that the error message indicates that at least one storage device in the array of storage devices has failed, a collecting component 610 adapted for collecting an array record comprising storage device characteristics of the failed storage device in response to determining that the error message indicates that the at least one storage device has failed, a collating component 615 adapted for collating a candidate record comprising a plurality of candidate entries, wherein each candidate entry comprises storage device characteristics for one of a plurality of candidate storage devices, a comparing component 625 adapted for comparing storage device characteristics of the failed storage device of the array record with the storage device characteristics of each of the candidate entries, and an identifying component 635 adapted for identifying a first candidate storage device having storage device characteristics that match the storage device characteristics of the failed storage device in response to the comparing component 625 identifying a candidate entry that matches the storage device of the array record and identifying a second candidate storage device having storage device characteristics most similar to the storage device characteristics of the failed storage device in response to the comparing component 625 not identifying a candidate entry that matches the failed storage device of the array record.

In some approaches, the storage device characteristics comprise at least one of: storage device capacity, storage device type, storage device bandwidth, storage device speed, storage device input/output group, storage device chain identification, storage device enclosure identification, and storage device slot identification.

In more approaches, the system 600 may also comprise an exchanging component 655 adapted for exchanging the failed storage device with the first candidate storage device in response to the identifying component 635 identifying that the first candidate storage device has storage device characteristics that match the storage device characteristics of the failed storage device or exchanging the failed storage device with the second candidate storage device in response to the identifying component 635 identifying that the second candidate storage device has storage device characteristics most similar to the storage device characteristics of the failed storage device.

In further approaches, the exchanging component 635 may be further adapted for concurrently copying data from one or more storage devices of the array of storage devices onto either the first or second candidate storage device.

Additionally, in some approaches, the system 600 may further comprise an adding component 660 adapted for adding a candidate entry comprising storage device characteristics associated with either the first or second candidate storage device to the candidate record. The receiving component 605 may also be further adapted for receiving an update message, wherein the update message indicates that the plurality of candidate storage devices comprises either the first or second candidate storage device in response to the exchanging component 655 exchanging the failed storage device with either the first or second candidate storage device. The comparing component 625 may be further adapted for comparing the array record with the candidate entries of a third candidate storage device and either the first or second candidate storage device, and the exchanging component 655 may be further adapted for exchanging either the first or second candidate storage device with the third candidate storage device in response to determining that the third candidate storage device has storage device characteristics that are more similar to the storage device characteristics of the array of storage devices than the first or second candidate storage device.

In another embodiment, the exchanging component 655 may be further adapted for concurrently copying data from one or more storage devices of the array of storage devices onto either the first, second, or third candidate storage device.

Of course, the functionality of any of these components may be utilized in a computer program product or a method on any device, as would be understood by one of skill in the art upon reading the present descriptions.

FIGS. 4 and 5 are set forth as logical flow chart diagrams. As such, the depicted order and labeled steps are indicative of one embodiment. Other steps and methods may be conceived that are equivalent in function, logic, or effect of one or more steps or portions thereof, of the illustrated method as would be understood by one of skill in the art upon reading the present descriptions. Additionally the format and symbols employed are provided to explain the logical steps of the method and are understood not to limit the scope of the method.

Figure 7:
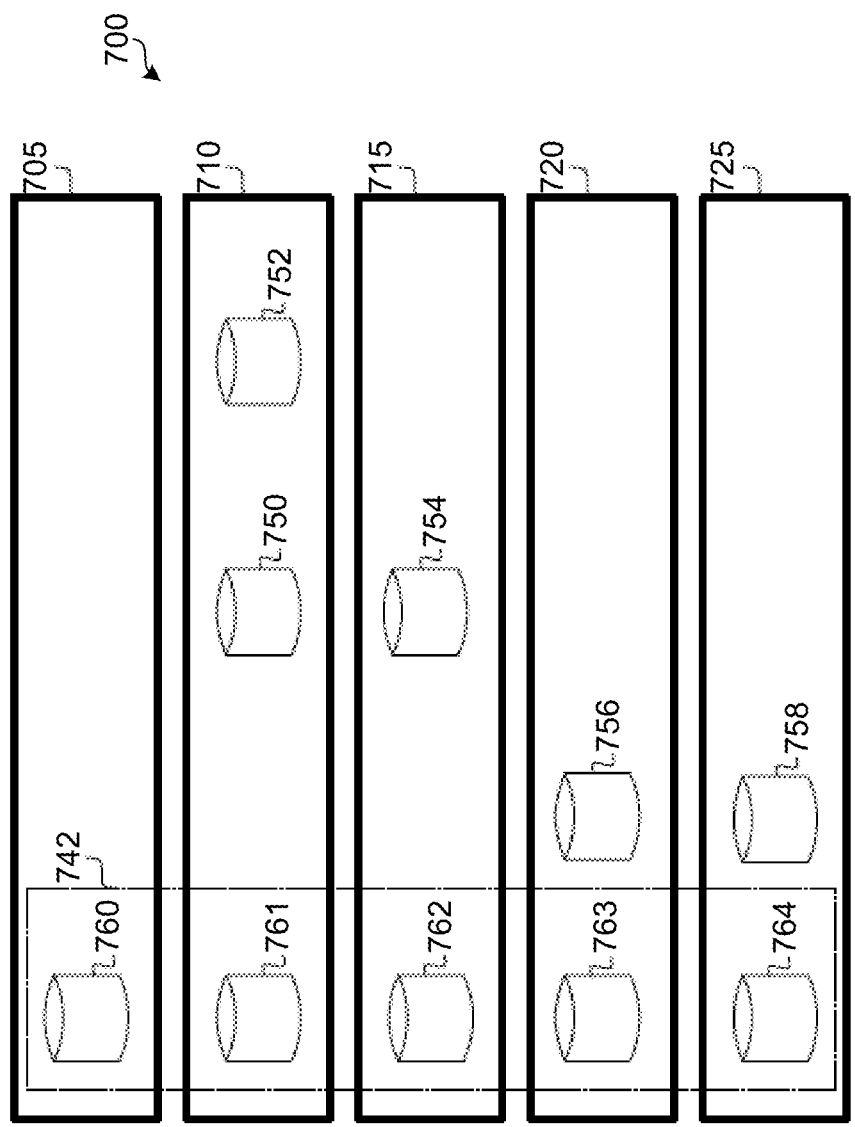
FIG. 7 depicts an exemplary storage subsystem in an initial state, according to one embodiment.

FIGS. 7-10 depict an exemplary storage subsystem used to illustrate a preferred embodiment. FIG. 7 depicts an exemplary storage subsystem in an initial state 700. The subsystem comprises five enclosures, "Enclosure 1" 705, Enclosure 2" 710, "Enclosure 3" 715, Enclosure 4" 720, and "Enclosure 5" 725. Enclosure 1 705 comprises a storage device 760. Enclosure 2 710 comprises three storage devices 761, 750, 752. Enclosure 3 715 comprises two storage devices 762, 754. Enclosure 4 720 comprises two storage devices 763, 756. Enclosure 5 725 comprises two storage devices 764, 758. The storage subsystem also comprises a RAID 5 (array 742) having five storage devices 760, 761, 762, 763, 764.

Figure 8:
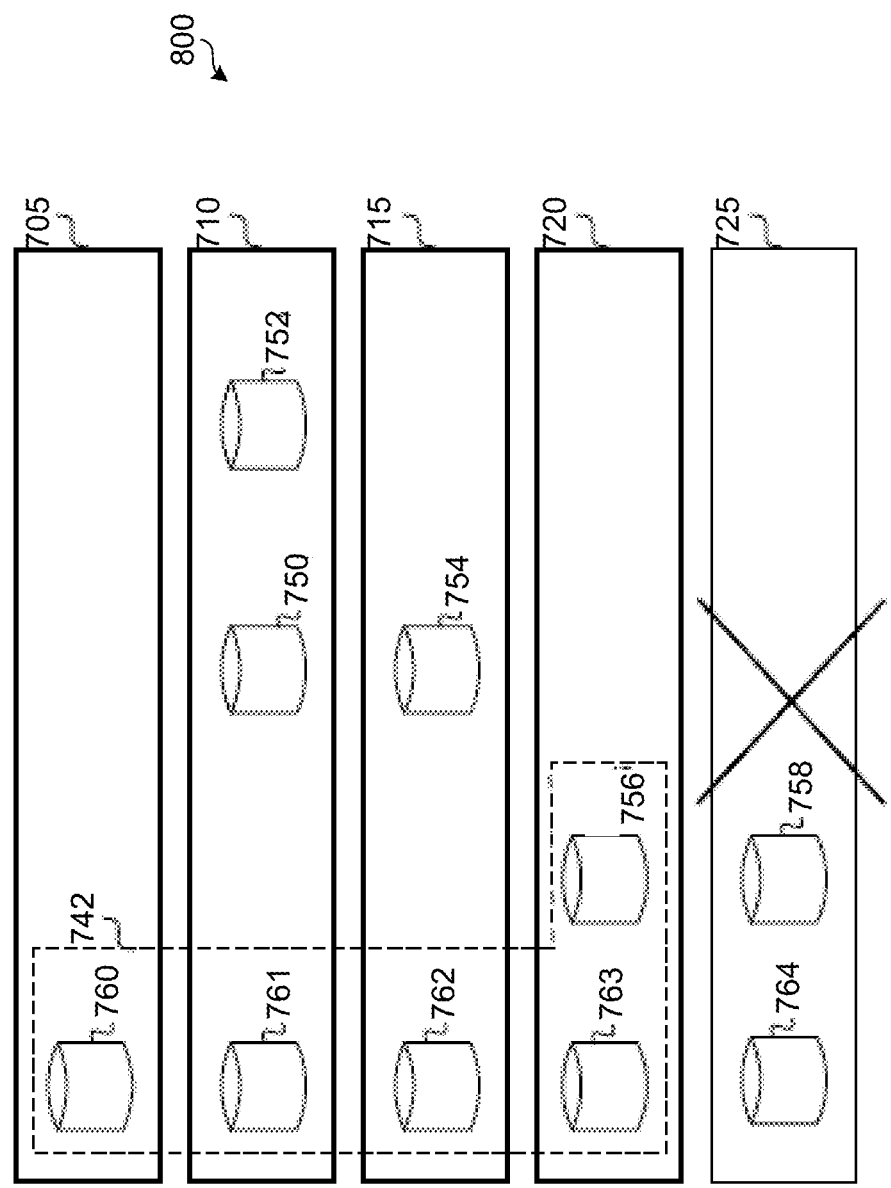
FIG. 8 depicts the exemplary storage subsystem after failure of an enclosure, according to one embodiment.
Figure 9:
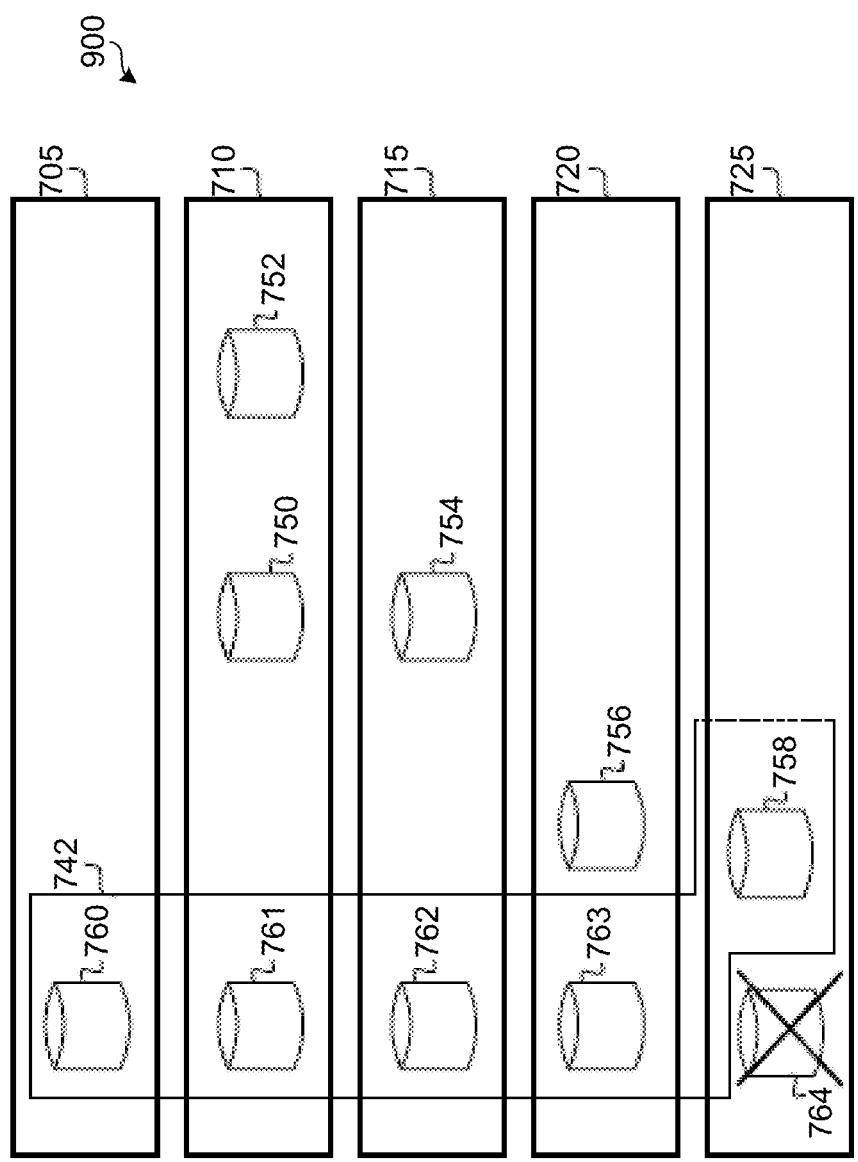
FIG. 9 depicts the exemplary storage subsystem after recovery of the enclosure with a failed storage device, according to one embodiment.

FIGS. 8-10 depict the same storage subsystem with different states of the method. FIG. 8 depicts the exemplary storage subsystem after failure of an enclosure, specifically Enclosure 5 725. FIG. 9 depicts the exemplary storage subsystem after recovery of the enclosure, once again Enclosure 5 725 with a failed storage device 764. FIG. 10 depicts the exemplary storage subsystem after replacement of the failed storage device 764 with a new storage device 785.

FIG. 11 depicts exemplars of records used, in accordance with a preferred embodiment. In one such preferred embodiment, storage devices 750, 752, 754, 756, which are candidates to be used as a spare storage device for the array 742, are assessed against an 'array requirement' that represents array characteristics of the storage devices 760, 761, 762, 763, 764 of the array 742. Preferably, there will be an exact match, where the size and performance of the candidate storage device 750, 752, 754, 756 is the same as that of the existing array members 760, 761, 762, 763. However, if no exact match is found, other candidate storage devices 750, 752, 754, 756 may be considered under different criteria, in one approach.

Referring now to 'performance' criteria, candidate storage devices 750, 752, 754, 756 are suitable as a spare storage device for the array 742 if their capacity is greater or equal to the array member size, and their performance is greater or equal to the array member performance goal. The performance criteria match also includes storage devices that possess either highly similar technology with the same or better performance characteristics or, alternatively, a technology possessing superior performance characteristics.

Referring now to 'capacity' criteria, candidate storage devices 750, 752, 754, 756 are suitable as a spare storage device for the array 742 if their capacity is greater or equal to the array member size, but their performance is less than the array member performance goal. If no candidate storage devices 750, 752, 754, 756 have a capacity of the array members 760, 761, 762, 763, 764, then there is no suitable candidate.

The distinction between performance and capacity criteria matches is that a performance criteria match will not degrade the performance of the array 742, but may reduce spare coverage of another array. A capacity criteria match will degrade the performance of the array 742, and must not be tolerated.

Of course, these criteria are offered by way of example only, and it will be evident to a person having ordinary skill in the art that other criteria could be used to determine suitable spare storage devices.

In a preferred embodiment, a spare storage device 756 may be selected for an array 742 from a plurality of candidate storage devices 750, 752, 754, 756, considering capability and location as factors in making the selection.

For example, in some embodiments, an exact match is chosen, but if no exact match exists, and there are multiple performance or capacity criteria matches, a closest performance criteria match is chosen over a closest capacity criteria match.

Moreover, a candidate storage device 750, 752, 754, 756 may be chosen based on a location. The following is a list of criteria in descending order of preference, according to one embodiment: exact slot; same enclosure; same chain; same I/O group; different I/O group. Usually, when taking a spare, the exact slot is not a candidate, but could be if the array has already spared and is unbalanced, with the original member having been replaced with a poor match.

Referring again to FIGS. 3-11, the select method starts at step 401. At step 405, a receiving component 605 of a management apparatus 601 operable in the RAID controller 40 receives an error message from the storage subsystem 15. The error message indicates that one of the storage devices 764 in the array 742 has failed. In one example, the failure is due to a failure of Enclosure 5 725, as depicted in FIG. 8. The apparatus 601 determines that the error message indicates that the array comprises a failed storage device 764. The apparatus 601 interacts with the storage subsystem 90 by using a send component 650 to send requests, and the receiving component 605 to receive data.

At step 210, a collecting component 610 collects characteristics of the storage device members 760, 761, 762, 763, 764 from array 742, storing the characteristics in an array record 1110. The array record 1110 indicates the ideal spare storage device with which to replace the failed storage device 764. Storage device characteristics may comprise long-term properties of the storage device capabilities that typically do not change, for example, capacity, physical size, and performance. Storage device characteristics may also comprise: a location of the storage device, for example, an input/output (I/O) group identification in an IBM SAN Volume Controller (SVC) IO Group; a chain ID; an enclosure ID that the storage device is in; a slot ID in the enclosure that the storage device is in, and any other criteria as would be understood by one of skill in the art upon reading the present descriptions.

In the exemplary storage subsystem 90, the characteristics comprise an identification 'id 1' in an identification column 1150; a storage device type "SAS" in a type column 1155; a size 146 GB in a size column 1160; a speed 15k revolutions per minute (rpm) in a speed column 1165; a location "Enclosure 5" in a location column 1170; and a bandwidth 70 Mbytes per second (MB/s) in a bandwidth column 1175, as an example.

In an alternative embodiment, other characteristics may be chosen, for example, input/output (TO) group; storage device chain identification; storage device enclosure identification; and storage device slot identification. A person skilled in the art will appreciate that many different characteristic parameters could be used in the array record 1110 to characterize the array 742.

At step 415, a collating component 615 collates the characteristics of candidate storage devices 750, 752, 754, 756 that are available to be used as an array spare storage device. The characteristics for each candidate storage device 750, 752, 754, 756 are each saved in a candidate entry 1105 for the candidate storage device 750, 752, 754, 756. A candidate record 1120, 1130, 1140 comprises a plurality of candidate entries 1105. Depicted candidate records 1120, 1130, 1140 represent different examples of the candidate record 1120, 1130, 1140 under different conditions of the select and balance methods.

At step 420, a retrieving component 620 retrieves the array record 1110 and the candidate record 1120, 1130, 1140. At step 425, a comparing component 625 compares the array record 1110 with each of the candidate entries 1105 by comparing the size parameter 1160. At step 430, any candidate entries 1105 that have a value of size parameter 1160 that equals or exceeds the value of the size parameter 1160 in the array record 1110 are stored by the store component 630 in the candidate record 1130, 1140. In contrast, any that are less are not stored in the candidate record 1130, 1140.

At step 435, when all candidate entries 1105 have been compared, the candidate record 1130, 1140 is assessed. At step 440, if there is an exact match of array characteristics 1110 with any of the candidate entries 1105, the select method passes to step 460. If there is no exact match, the select method passes to step 440. At step 440, the candidate record 1130, 1140 is assessed to check whether there are any candidate entries 1105. If the candidate record 1130, 1140 comprises no candidate entries 1105, indicating that there are no candidates that could act as a spare storage device for the array 742, the select method passes to step 499, where the select method ends. A minimum requirement for a spare storage device is that its size is at least the size of the array members 760, 761, 762, 763, 764. RAID algorithms work on a set of storage devices with identical capacity. If an array 742 is created with storage devices of different capacity, then only the size of the smallest is used on each one. This size is called the array member size, and is set on array creation. However, if the candidate record 1130, 1140 comprises at least one candidate entry 1105, the select method passes to step 445.

At step 445, the comparing component 625 compares the array record 1110 with each of the candidate entries 1105 by comparing a further parameter 1155, 1165, 1170. At step 450, any candidate entries 1105 that have a parameter value 1155, 1165, 1170 that meets the array requirement are stored by the storing component 630 in the candidate record 1130, 1140. In contrast, any that do not meet the array requirement are not considered as candidates.

At step 455, if there are more parameters 1155, 1165, 1170 to assess the select method passes back to step 445. If there are no more parameters 1155, 1165, 1170, the select method passes to step 460.

At step 460, a select component 635 assesses the candidate record 1130, 1140. If there are more than one candidate entry 1105 in the candidate record 1130, the candidate storage device 756 is chosen based on the choice factors. If there is only one candidate entry 1105 in the candidate record 1140, the candidate storage device 756 corresponding to that candidate entry 1105 is chosen. An exchanging component 655 exchanges the failed storage device 764 with the chosen candidate storage device 756 in the array 742.

In preferred embodiments, exchanging comprises rebuilding the data from the array 742 onto the candidate storage device 756 concurrently, that is with input/output operations ongoing to the array 742. FIG. 8 depicts the array 742 after failed storage device 764 has been exchanged with the selected storage device 756.

At step 501, the select method of FIG. 4 passes to the balance method of FIG. 5. FIG. 5 is described with the aid of FIGS. 3-11. FIG. 9 depicts a state after error recovery procedures have been carried out on Enclosure 5 725 to allow the enclosure 725 to come back on line. Enclosure 5 725 comprises a failed storage device 764 and storage device 758. The storage device 758 becomes a new candidate storage device 758 for the array 742. As an example to illustrate the balance method, the storage device 758 is a better match for the array 742 than the selected storage device 756.

At step 505, the receiving component 605 receives an update record from the storage subsystem indicating that the storage device 758 is now available for the array 742. The comparing component 625 compares the candidate entry 1105 for the selected storage device 756 with the array record 1110 to check whether the characteristics of the selected storage device 756 already exactly match the characteristics of the array 742. At step 510, if there is an exact match, the balance method ends at step 599, because there is no requirement to search for a better spare storage device. However, if there is no exact match, the balance method passes to step 515.

At step 515, an analyzing component 640 analyses the characteristics of the available candidate storage devices 750, 752, 754, 758 with the characteristics of the array 742 to determine whether there is a candidate storage device 750, 752, 754, 758 that is a better match for the array 742 than the selected storage device 756. Analyzing the candidate entries 1105, 1108 against the array record 1110 completes the analysis. The analysis is performed considering the same factors that were used in step 460.

At step 520, if there is no better match, the balance method ends at step 599, because re-balancing is not possible. If a better match does exist, the balance method passes to step 525. At step 525, the analyzing component 640 determines whether the incremental characteristic improvement of the better match (storage device 758) is sufficient to start a rebalance exchange operation. For example, if the capacity of the better match is only 10 GB different from the selected storage device 5756, but in all other respects is the same, it is not worth rebalancing. If the incremental improvement is not sufficient, the balance method ends at step 599.

At step 530, a scan component 645 scans the array 742 to determine whether an exchange of storage devices 760, 761, 762, 763, 756 is already underway. If an exchange is not underway, the balance method passes to step 545 described below. If an exchange is underway, the balance method passes to step 535. At step 535, if the scan component determines that the exchange is already underway with the better match (storage device 758), the balance method passes to step 560, described below. If the undergoing exchange is not with the better match 758, at step 540, the undergoing exchange is abandoned. At step 545, a new exchange with the better match is started to improve the balancing of the array 742.

At step 560, the exchanging component 650 performs a balancing exchange of the selected storage device 756 with the better match 758. The balancing exchange comprises an exchange at step 550. At step 555, the exchanging component 650 determines whether another candidate storage device becomes available. If another candidate storage device does become available, the balance method passes back to step 515. If another candidate storage device does not become available, the balance method continues at step 550 until the exchange is complete.

In a preferred embodiment, the balance exchange comprises a concurrent rebuild of array data from the array members 760, 761, 762, 763 to the better match 758. In an alternative embodiment, the balance exchange comprises a storage device data copy from the selected storage device 756 to the better match 758. Finally, the balance method ends at step 599.

FIG. 9 depicts the state of the storage subsystem 90 after spare storage device 756 has been exchanged with the storage device 758, because storage device 758 is a better match for the array characteristics than selected storage device 756. Referring to FIG. 11, storage device 758 is a better match in this example, because its capacity of 146 GB matches that of the array 742, and also because it is located in the same enclosure Enclosure 5 725 that the failed storage device 764 was located.

At a later time, a replacement operation is carried out on Enclosure 5 725 to replace failed storage device 764 with new storage device 785. The balance method depicted in FIG. 5 is again followed to replace the storage device 758 with the new storage device 785. FIG. 10 depicts the state of the storage subsystem 90 after storage device 758 has been exchanged with new candidate storage device 785. New candidate storage device 785 is a better match for the array characteristics than spare storage device 758 and storage device 756, because storage device 785 has identical properties to failed storage device 764 that it is replacing. Storage device 785 is also a better match in this example, because its slot location matches that of the failed storage device 764.

In a preferred embodiment as disclosed in the present descriptions, the apparatus attempts to reinstate the array configuration by using concurrent exchange to restore exact capability matches in the right location when an array is not made up of its intended storage device configuration and is 'unbalanced'. So that the apparatus does not start balancing concurrent exchanges between storage devices when there is no functional benefit the following rules are applied for starting the balancing process: Start balancing concurrent exchange of a Capacity capability match for a Performance capability match if there is no Exact capability match available; Start balancing concurrent exchange between two drives in the same capability match category if that results in a closer match to the member chain goal. In a subsystem 90 with multiple I/O groups, this includes exchanging out a storage device in the wrong I/O group for one in the right I/O group on the wrong chain. In addition, two exact capability matches are exchanged if that results in a perfect match to the member location goal; and, if a better match, according to the above rules, becomes available before the exchange is complete, the existing exchange is abandoned and a new one begun.

In an alternative embodiment, the array 742 member goals are defined from the storage devices 760, 761, 762, 763, 764 when the array 742 is created, but can be modified to match an existing configuration. In an alternative embodiment the number of candidate entries 1105 is assessed after each store step 430, 450 to assess whether only one candidate entry 1105 exists. If only one candidate entry exists the method 400 passes to step 460.

In an alternative embodiment, the selection and balance methods consider storage devices that are being used by other array members as concurrent exchange target drives. The concurrent exchange targets can be consumed as spares without impacting array redundancy.

In an alternative embodiment, when multiple arrays all need a spare or need to start a balancing concurrent exchanges at the same time then it is important to find the array member that has the closest match to each of the available drives. The apparatus solves this problem by evaluating each of the array member goals set in turn and comparing them to the available storage device properties and recording a measure of how closely the array member matches to the storage device properties. When one array member has selected a storage device and another array member is identified as being a closer match then it 'trumps' the previous selection and is recorded as the desired array member to storage device selection. Iterating over this algorithm allows the closest matches to be found for the array member—storage device selections.

In an alternative embodiment, Error Recovery Procedure (ERP) routines could identify when an array member performance is getting worse and decide to swap before failure has occurred.

It should be evident to the skilled person that the present invention does not just apply to its use in RAID 5 configurations. Other storage topologies are suitable for application as disclosed in the present descriptions.

Figure 12:
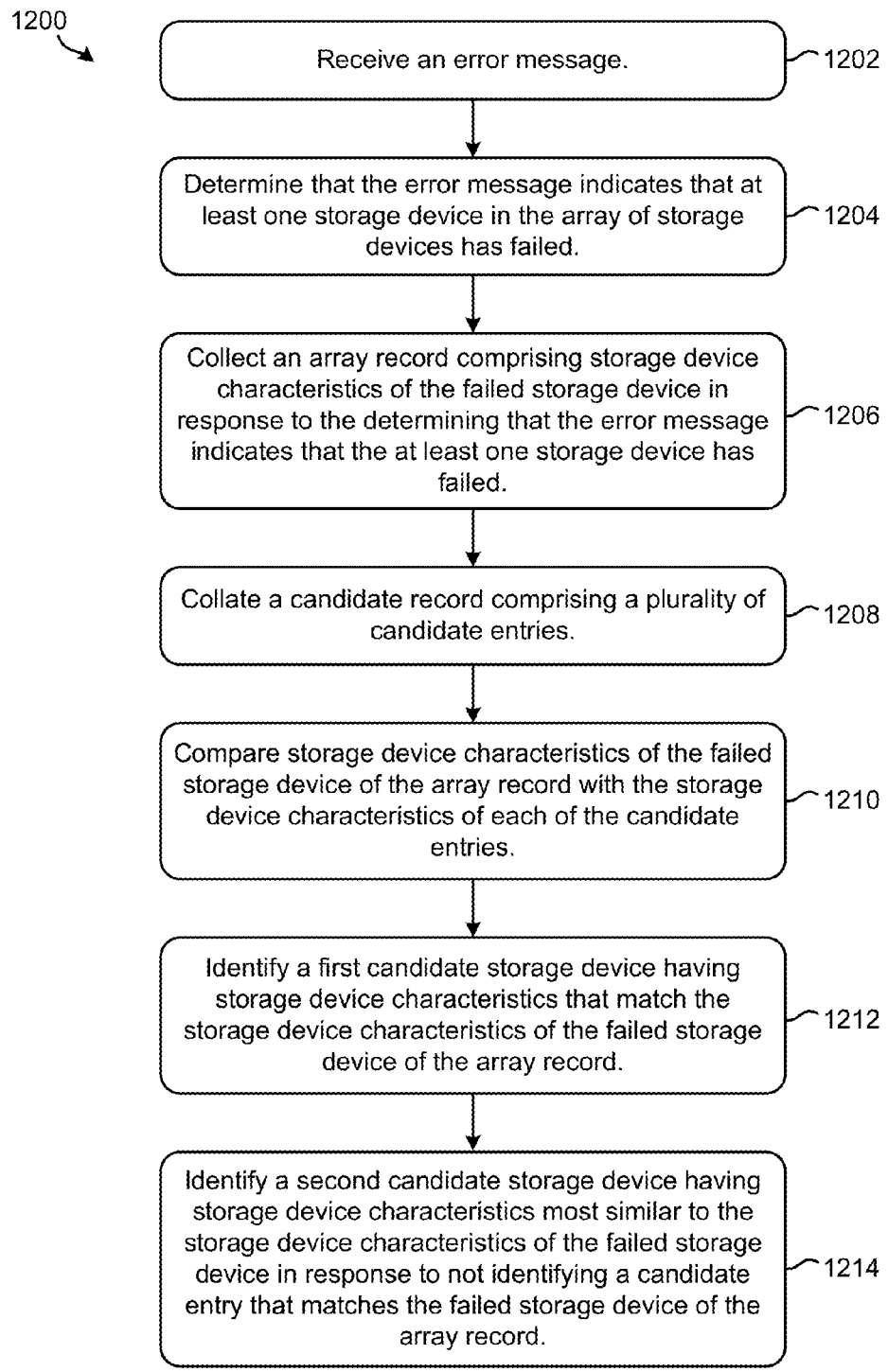
FIG. 12 shows a flowchart of a method, according to one embodiment.

Referring to FIG. 12, a method 1200 for managing storage devices in a storage subsystem having an array of storage devices is described according to one embodiment. The method 1200 may be carried out in any desired environment, including those depicted in FIGS. 1-11, in various embodiments.

In step 1202, an error message is received.

In step 1204, it is determined that the error message indicates that at least one storage device in the array of storage devices has failed.

In step 1206, an array record is collected comprising storage device characteristics of the failed storage device in response to step 1204 successfully executing.

In step 1208, a candidate record is collated comprising a plurality of candidate entries, wherein each candidate entry comprises storage device characteristics for one of a plurality of candidate storage devices.

In step 1210, storage device characteristics of the failed storage device of the array record are compared with the storage device characteristics of each of the candidate entries.

In step 1212, a first candidate storage device is identified having storage device characteristics that match the storage device characteristics of the failed storage device in response to identifying a candidate entry that matches the storage device of the array record.

In step 1214, a second candidate storage device is identified having storage device characteristics most similar to the storage device characteristics of the failed storage device in response to not identifying a candidate entry that matches the failed storage device of the array record.

Of course, any of the embodiments and examples described herein may be implemented in the method 1200, as would be understood by one of skill in the art upon reading the present descriptions.

The flowchart and block diagrams in the Figures illustrate the architecture, functionality, and operation of possible implementations of systems, methods and computer program products according to various embodiments as disclosed in the present descriptions. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for improved rebalancing of storage devices in a storage subsystem having an array of storage devices, the computer program product comprising a computer readable storage medium having program instructions embodied therewith, the program instructions being executable by a processor to cause the processor to perform a method comprising:

determining, by the processor, that a storage device in an array of storage devices has failed;

identifying, by the processor, a first candidate storage device for hot spare takeover of the failed storage device; and exchanging, by the processor, the first candidate storage device with a second candidate storage device in response to determining that the second candidate storage device has storage device characteristics that are more similar to the storage device characteristics of the array of storage devices than the first candidate storage device thereby incrementally rebalancing the array of storage devices toward an original configuration.

2. The computer program product as recited in claim 1, wherein the storage device characteristics comprise at least one of:

storage device capacity;
  storage device type;
  storage device bandwidth;
  storage device speed;
  storage device input/output group;
  storage device chain identification;
  storage device enclosure identification; and
  storage device slot identification.

3. The computer program product as recited in claim 1, comprising program instructions executable by the processor to cause the processor to:

receive an error message;
  determine that the error message indicates that the storage device in the array of storage devices has failed;
  collect an array record comprising storage device characteristics of the failed storage device in response to the determining that the error message indicates that the at least one storage device has failed; and
  collate a candidate record comprising a plurality of candidate entries, wherein each candidate entry comprises storage device characteristics for the candidate storage devices.

4. The method as recited in claim 1, comprising program instructions executable by the processor to cause the processor to concurrently copy data from one or more storage devices of the array of storage devices onto either the first or second candidate storage device.

5. A computer-implemented method for improved rebalancing of storage devices in a storage subsystem having an array of storage devices, the method comprising:

determining that at least one storage device in the array of storage devices has failed;
  comparing storage device characteristics of the failed storage device with storage device characteristics of each of a plurality of candidate devices;
  attempting to identify a first candidate storage device having storage device characteristics that match the storage device characteristics of the failed storage device; and
  identifying a second candidate storage device having storage device characteristics most similar to the storage device characteristics of the failed storage device from among the plurality of candidate devices in response to not identifying a candidate device that matches the failed storage device;
  in response to a third candidate storage device becoming available, determining whether the third candidate storage device has storage device characteristics that are a better match to the storage device characteristics of the failed storage device than the storage device characteristics of the second candidate storage device; and
  in response to determining that the third candidate storage device has storage device characteristics that are a better match, exchanging the second candidate storage device with the third candidate storage device for incrementally rebalancing the array of storage devices toward an original configuration.

6. The computer-implemented method as recited in claim 5, wherein the storage device characteristics comprise at least one of:

storage device capacity;
  storage device type;
  storage device bandwidth;
  storage device speed;
  storage device input/output group;
  storage device chain identification;
  storage device enclosure identification; and
  storage device slot identification.

7. The computer-implemented method as recited in claim 5, comprising causing an exchange of the failed storage device with the first candidate storage device in response to identifying that the first candidate storage device has storage device characteristics that match the storage device characteristics of the failed storage device or exchange the failed storage device with the second candidate storage device in response to identifying that the second candidate storage device has storage device characteristics most similar to the storage device characteristics of the failed storage device.

8. The computer-implemented method as recited in claim 7, comprising concurrently copying data from one or more storage devices of the array of storage devices onto either the first or second candidate storage device.

9. The computer-implemented method as recited in claim 5, comprising exchanging either the first or second candidate storage device with the third candidate storage device in response to determining that the third candidate storage device has storage device characteristics that are more similar to the storage device characteristics of the array of storage devices than the first or second candidate storage device.

10. The computer-implemented method as recited in claim 9, comprising concurrently copying data from one or more storage devices of the array of storage devices onto either the first, second, or third candidate storage device.

11. The computer-implemented method as recited in claim 5, comprising:

receiving an error message;
  determining that the error message indicates that the storage device in the array of storage devices has failed;
  collecting an array record comprising storage device characteristics of the failed storage device in response to the determining that the error message indicates that the at least one storage device has failed;
  collating a candidate record comprising a plurality of candidate entries, wherein each candidate entry comprises storage device characteristics for the candidate storage devices.

12. A system, comprising:

a processor and logic integrated with and/or executable by the processor, the logic being configured to:
  determine, by the processor, that at least one storage device in an array of storage devices has failed;
  compare, by the processor, storage device characteristics of the failed storage device with storage device characteristics of each of a plurality of candidate devices;

attempt, by the processor, to identify a first candidate storage device having storage device characteristics that match the storage device characteristics of the failed storage device; and identify, by the processor, a second candidate storage device having storage device characteristics most similar to the storage device characteristics of the failed storage device from among the plurality of candidate devices in response to not identifying a candidate device that matches the failed storage device;

in response to a third candidate storage device becoming available, determine, by the processor, whether the third candidate storage device has storage device characteristics that are a better match to the storage device characteristics of the failed storage device than the storage device characteristics of the second candidate storage device; and in response to determining that the third candidate storage device has storage device characteristics that are a better match, exchange, by the processor, the second candidate storage device with the third candidate storage device for incrementally rebalancing the array of storage devices toward an original configuration.

13. The system as recited in claim 12, wherein the storage device characteristics comprise at least one of:
storage device capacity;
storage device type;
storage device bandwidth;
storage device speed;
storage device input/output group;
storage device chain identification;
storage device enclosure identification; and
storage device slot identification.

14. The system as recited in claim 12, comprising logic configured to cause an exchange of the failed storage device with the first candidate storage device in response to identifying that the first candidate storage device has storage device characteristics that match the storage device characteristics of the failed storage device or exchange the failed storage device with the second candidate storage device in response to identifying that the second candidate storage device has storage device characteristics most similar to the storage device characteristics of the failed storage device.

15. The system as recited in claim 14, comprising logic configured to concurrently copy data from one or more storage devices of the array of storage devices onto either the first or second candidate storage device.

16. The system as recited in claim 12, comprising logic configured to exchange either the first or second candidate storage device with a third candidate storage device in response to determining that the third candidate storage device has storage device characteristics that are more similar to the storage device characteristics of the array of storage devices than the first or second candidate storage device.

17. The system as recited in claim 16, comprising logic configured to concurrently copy data from one or more storage devices of the array of storage devices onto either the first, second, or third candidate storage device.

18. The system as recited in claim 12, comprising logic configured to:
receive an error message;
determine that the error message indicates that the storage device in the array of storage devices has failed;
collect an array record comprising storage device characteristics of the failed storage device in response to the determining that the error message indicates that the at least one storage device has failed;
collate a candidate record comprising a plurality of candidate entries, wherein each candidate entry comprises storage device characteristics for the candidate storage devices.

\* \* \* \* \*